United States Patent
Kawazoe et al.

(10) Patent No.: US 11,156,537 B2
(45) Date of Patent: Oct. 26, 2021

(54) HARDNESS TESTER

(71) Applicant: MITUTOYO CORPORATION, Kanagawa (JP)

(72) Inventors: Masaru Kawazoe, Hiroshima (JP); Naoki Izumi, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 210 days.

(21) Appl. No.: 16/587,213

(22) Filed: Sep. 30, 2019

(65) Prior Publication Data
US 2020/0110012 A1    Apr. 9, 2020

(30) Foreign Application Priority Data
Oct. 3, 2018 (JP) .............................. JP2018-187835

(51) Int. Cl.
*G01N 3/42* (2006.01)
*G01N 3/08* (2006.01)
*G01N 3/44* (2006.01)

(52) U.S. Cl.
CPC ................. *G01N 3/42* (2013.01); *G01N 3/08* (2013.01); *G01N 3/44* (2013.01); *G01N 2203/008* (2013.01); *G01N 2203/0019* (2013.01); *G01N 2203/0076* (2013.01); *G01N 2203/0078* (2013.01); *G01N 2203/0082* (2013.01)

(58) Field of Classification Search
CPC .. G01N 3/42; G01N 3/08; G01N 3/44; G01N 2203/008; G01N 2203/0019; G01N 2203/0078; G01N 2203/0076; G01N 2203/0082
See application file for complete search history.

(56) References Cited

U.S. PATENT DOCUMENTS

| 6,336,359 | B1 * | 1/2002 | Kawazoe | G01N 3/40 73/81 |
| 8,117,892 | B2 * | 2/2012 | Kawazoe | G01N 3/42 73/1.89 |
| 8,566,735 | B2 | 10/2013 | Takemura et al. | |
| 8,578,284 | B2 | 11/2013 | Takemura et al. | |

(Continued)

FOREIGN PATENT DOCUMENTS

JP    2003-50189    2/2003

OTHER PUBLICATIONS

U.S. Appl. No. 16/589,513 to Masaru Kawazoe, which was filed Oct. 1, 2019.

*Primary Examiner* — Jonathan M Dunlap
(74) *Attorney, Agent, or Firm* — Greenblum & Bernstein, P.L.C.

(57) ABSTRACT

A controller of a hardness tester can determine, in a condition where a driver is not in operation and when a spring displacement detector and an arm displacement detector detect an amount of displacement of respective objects (plate spring and loading arm), that a loading arm and a plate spring are deformed according to changes in environmental temperature. A favorable hardness test can be performed by the hardness tester corresponding to the environmental temperature according to the determination by carrying out an initialization process that resets the displacement amount of respective object to zero, the displacement amount detected by the spring displacement detector and the arm displacement detector respectively.

2 Claims, 5 Drawing Sheets

(56) References Cited

U.S. PATENT DOCUMENTS

| | | |
|---|---|---|
| 8,849,588 B2 | 9/2014 | Sawa et al. |
| 8,887,558 B2 | 11/2014 | Kawazoe |
| 9,003,871 B2 | 4/2015 | Sadahiro |
| 9,032,784 B2 | 5/2015 | Ariga |
| 9,063,048 B2 | 6/2015 | Koshimizu |
| 9,111,332 B2 | 8/2015 | Miyakura |
| 9,146,185 B2 | 9/2015 | Sadahiro |
| 9,207,156 B2 | 12/2015 | Ariga et al. |
| 9,291,538 B2 | 3/2016 | Sawa |
| 9,341,554 B2 | 5/2016 | Tsujii et al. |
| 9,366,609 B2 | 6/2016 | Kataoka |
| 9,417,171 B2 | 8/2016 | Takemura et al. |
| 9,442,054 B2 | 9/2016 | Takemura et al. |
| 9,442,056 B2 | 9/2016 | Koshimizu et al. |
| 10,001,432 B2 | 6/2018 | Furuta et al. |
| 10,024,774 B2 | 7/2018 | Koshimizu et al. |
| 10,094,753 B2 | 10/2018 | Sawa et al. |
| 10,163,201 B2 | 12/2018 | Sawa et al. |
| 10,495,557 B2 | 12/2019 | Tsujii et al. |
| 10,914,661 B2 * | 2/2021 | Yano ................. G01N 3/42 |
| 2009/0145196 A1 * | 6/2009 | Kawazoe ............. G01N 3/42 |
| | | 73/1.89 |
| 2014/0177937 A1 | 6/2014 | Ariga et al. |
| 2016/0018308 A1 | 1/2016 | Kataoka et al. |
| 2017/0102305 A1 | 4/2017 | Tsujii et al. |
| 2017/0122856 A1 | 5/2017 | Koshimizu |
| 2018/0284000 A1 | 10/2018 | Koshimizu et al. |
| 2018/0313730 A1 | 11/2018 | Yano et al. |
| 2019/0128787 A1 | 5/2019 | Sadahiro |

* cited by examiner

HARDNESS TESTER

CROSS-REFERENCE TO RELATED APPLICATIONS

The present application claims priority under 35 U.S.C. § 119 of Japanese Application No. 2018-187835, filed on Oct. 3, 2018, the disclosure of which is expressly incorporated by reference herein in its entirety.

BACKGROUND OF THE INVENTION

1. Field of the Invention

The present invention relates to a hardness tester.

2. Description of Related Art

Conventionally, a hardness tester is known which measures hardness of a sample by loading a predetermined test force onto a surface of a sample (work piece) using an indenter to form an indentation. For example, a Rockwell hardness tester is a tester that measures the hardness of a sample by loading a predetermined test force onto a surface of the sample with a diamond conical indenter or a ball indenter to form an indentation, and measuring a pressing depth of the indenter during indentation formation (see, for example, Japanese Patent Laid-open Publication No. 2003-050189).

In this hardness tester, driving force of a servo motor is transmitted to a loading arm via a plate spring to rotate the loading arm, and an indentation is formed by pressing an indenter installed at a forefront end of the loading arm against the sample. Specifically, in this hardness tester, the test force is generated by the servo motor deforming the plate spring. When the hardness tester forms the indentation by pressing the indenter against the sample, an amount of deformation of the plate spring corresponding to the test force is measured by a spring displacement amount sensor and the deformation amount is controlled by the servo motor, and in addition, the pressing depth of the indenter against the sample is measured by an arm position sensor based on an amount of displacement of the loading arm.

However, when the hardness tester noted in Japanese Patent Laid-open Publication No. 2003-050189 is placed under a high temperature environment or a low temperature environment, the loading arm and the plate spring may experience a thermal expansion or a thermal contraction. When the arm position sensor and the spring displacement amount sensor detect the deformation of the loading arm and the plate spring accompanied by the thermal expansion or thermal contraction, a defective operation may occur. For example, the hardness tester, when an operation is not performed, may mistake the deformation of the loading arm or the plate spring detected by the arm position sensor or the spring displacement amount sensor as a trigger to initiate a test. Also, when the hardness test is performed in a state where the arm position sensor and the spring displacement amount sensor are detecting the deformation of the loading arm and the plate spring accompanied by the thermal expansion or thermal contraction, measurement results including an error may be obtained.

SUMMARY OF THE INVENTION

The present invention provides a hardness tester that is capable of favorably performing a hardness test without being influenced by changes in environmental temperature.

In order to resolve the above-noted issues, an invention according to one aspect of the present invention is a hardness tester that measures hardness of a sample by loading a predetermined test force onto a surface of the sample using an indenter. The hardness tester includes a loading arm provided with the indenter; a plate spring a first end of which is fixated to the loading arm; a driver that displaces the loading arm by bending the plate spring and presses the indenter against the sample; a spring displacement detector that detects an amount of displacement of the plate spring; an arm displacement detector that detects an amount of displacement of the loading arm; and a controller that carries out a predetermined process in response to the spring displacement detector detecting the displacement amount of the plate spring and the arm displacement detector detecting the displacement amount of the loading arm. In a condition where the driver is in operation so as to press the indenter against the sample, the controller performs a process to calculate hardness of the sample based on the displacement amount of the plate spring and the displacement amount of the loading arm that are detected by the spring displacement detector and the arm displacement detector respectively. In a condition where the driver is not in operation and when the spring displacement detector and the arm displacement detector detect the displacement amount of respective objects, (the determination is made that the loading arm and the plate spring are deformed accompanied by the changes in environmental temperature), and the controller performs a process to inform a user to carry out an initialization resetting the displacement amount of respective object to zero, the displacement amount detected by the spring displacement detector and the arm displacement detector respectively.

Another aspect of the present invention is the hardness tester that measures harness of the sample by loading the predetermined test force onto the surface of the sample using the indenter. The hardness tester includes the loading arm provided with the indenter; the plate spring the first end of which is fixated to the loading arm; the driver that displaces the loading arm by bending the plate spring and presses the indenter against the sample; the spring displacement detector that detects the displacement amount of the plate spring; the arm displacement detector that detects the displacement amount of the loading arm; and the controller that carries out the predetermined process in response to the spring displacement detector detecting the displacement amount of the plate spring and the arm displacement detector detecting the displacement amount of the loading arm. In a condition where the driver is in operation so as to press the indenter against the sample, the controller performs a process to calculate hardness of the sample based on the displacement amount of the plate spring and the displacement amount of the loading arm that are detected by the spring displacement detector and the arm displacement detector respectively. In a condition where the driver is not in operation and when the spring displacement detector and the arm displacement detector detect the displacement amount of respective objects, (the determination is made that the loading arm and the plate spring are deformed accompanied by the changes in environmental temperature), and the controller carries out an initialization process to reset the displacement amount of respective object to zero, the displacement amount detected by the spring displacement detector and the arm displacement detector respectively.

According to the present invention, a hardness test can be performed favorably in response to the changes in environmental temperature.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of a hardness tester according to the present invention is described in detail with reference to the drawings. Various technically preferred limitations are applied to the embodiment described below in order to embody the present invention, but the scope of the present invention is not limited by the following embodiment nor the illustrated examples. The hardness tester according to the present embodiment is a Rockwell hardness tester that measures hardness of a sample by loading a predetermined test force onto a surface of the sample with an indenter.

Figure 1:
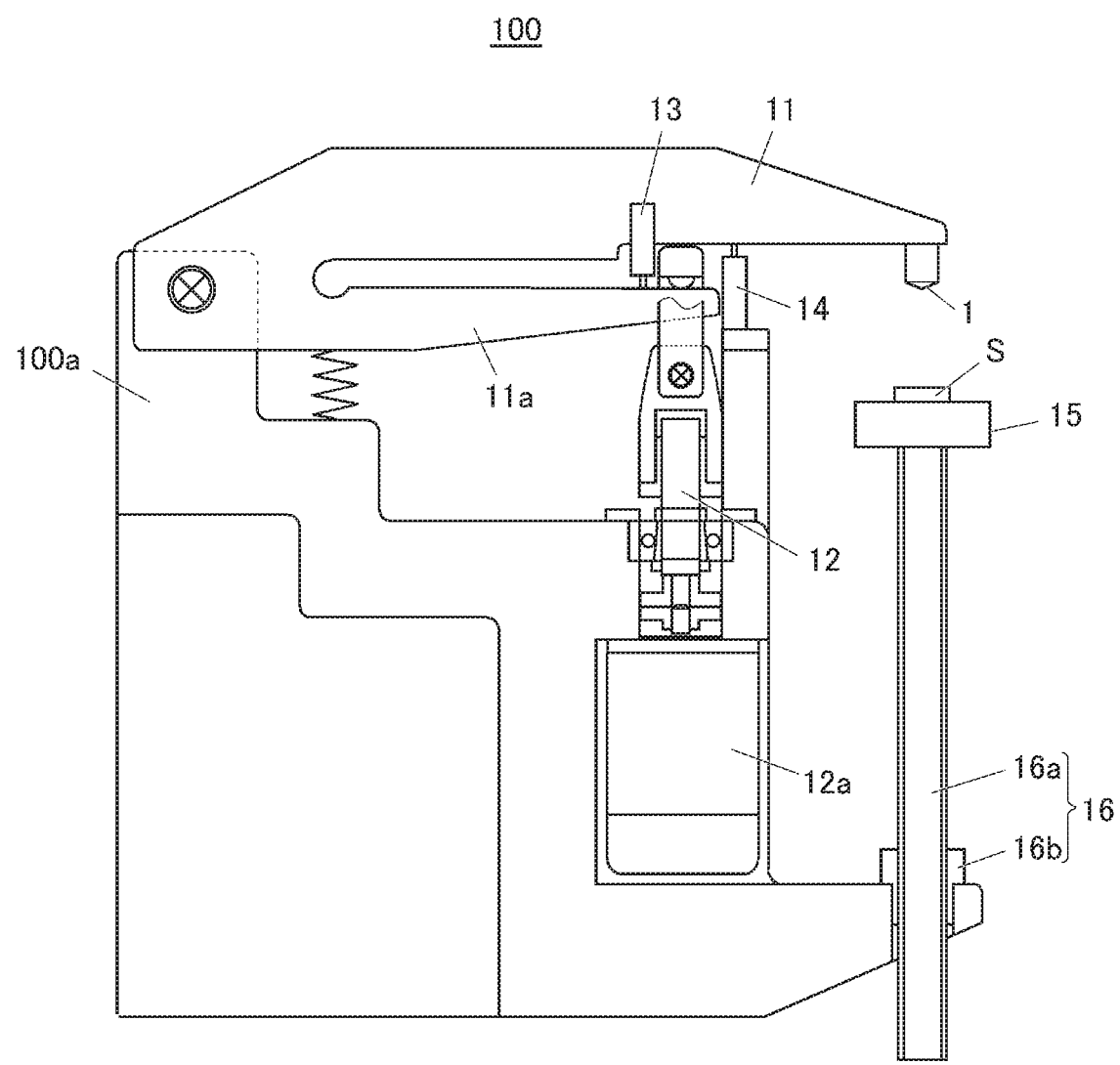
FIG. 1 is a side view illustrating a configuration of relevant portions of a hardness tester according to an embodiment.
Figure 2:
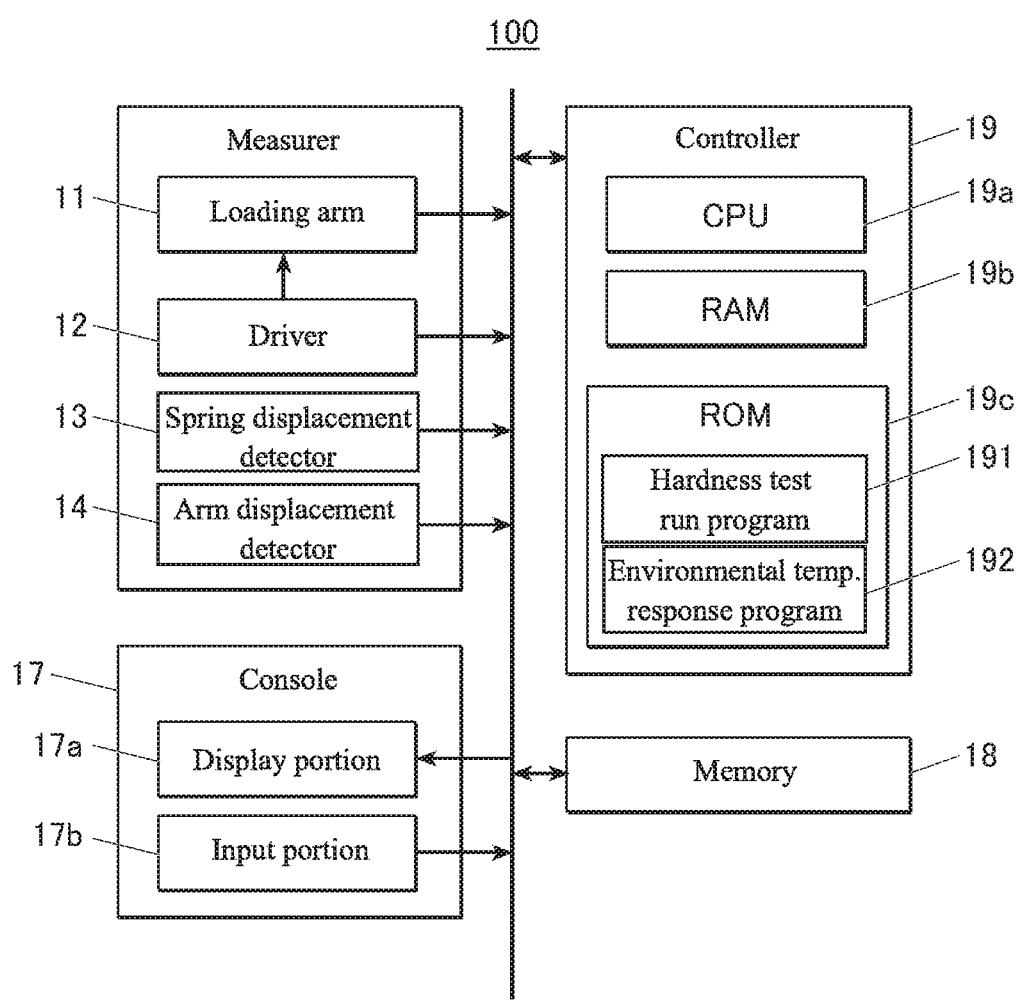
FIG. 2 is a block diagram of a control structure of the hardness tester according to the embodiment.

As shown in FIGS. 1 and 2, for example, a hardness tester 100 according to the present embodiment is configured to include a loading arm 11 provided with an indenter 1; a plate spring 11a a first end of which is fixated to the loading arm 11; a driver (press) 12 that displaces the loading arm 11 by bending the plate spring 11a and that presses the indenter 1 against a sample S; a spring displacement detector 13 that detects an amount of displacement of the plate spring 11a; an arm displacement detector 14 that detects an amount of displacement of the loading arm 11; a sample stage 15 on which the sample S is placed on a top surface thereof; a console 17; a memory 18; a controller 19; and the like. Various operation controls in the hardness tester 100 are performed by the controller 19 illustrated in FIG. 2.

The loading arm 11 is rotatably provided to a tester main body 100a, and is configured such that various types of indenters can be swapped out and installed at a forefront end of the loading arm 11. The various types of indenters that can be attached to the loading arm 11 may include an indenter 1 that forms an indentation on a sample surface, or a flat indenter (not shown in the drawings) that presses against a targeted sample without damaging the sample.

The plate spring 11a is a test force generating spring that is integrally provided to the loading arm 11 and generates a test force through elastic deformation.

The driver 12 includes a stepping motor, a servo motor, or the like, for example, as a drive source 12a. The power generated by the drive source 12a is transmitted to the loading arm 11 via the plate spring 11a, and the loading arm 11 is rotated, causing the forefront end of the loading arm 11 to approach the sample stage 15, and the indenter 1 or flat indenter is pressed against the sample S that has been placed on the sample stage 15. In addition, the driver 12 causes the loading arm 11 to rotate in a direction away from the sample stage 15 and displaces the loading arm 11 to a predetermined retreat position. The retreat position refers to an arrangement that creates distance between the various indenters and the sample stage 15, and that allows the indenter 1 or the sample S to be swapped out, or allows a predetermined preparation for measurement.

The spring displacement detector 13 detects the displacement amount of the plate spring 11a in the loading arm 11. Specifically, the spring displacement detector 13 is configured by, for example, a displacement sensor unit (linear scale) which optically reads a glass scale, and detects the displacement amount of the plate spring 11a when the plate spring 11a transmits to the loading arm 11 a force generated by the driver 12 (drive source 12a). The displacement amount of the plate spring 11a detected by the spring displacement detector 13 is continuously output to the controller 19. Accordingly, the test force being loaded onto the indenter 1 can be detected continuously.

The arm displacement detector 14 detects the displacement amount of the loading arm 11. Specifically, the arm displacement detector 14 is configured by, for example, a displacement sensor unit (linear scale) which optically reads a glass scale, and detects the displacement amount rotated by the loading arm 11. The displacement amount of the loading arm 11 detected by the arm displacement detector 14 is output to the controller 19.

The sample stage 15 is provided below the various indenters installed on the loading arm 11, and a sample S against which the various indenters press is placed on the sample stage 15.

A sample stage height adjuster 16 includes a support column 16a provided with male threading on an outer circumferential surface thereof, and a handle 16b provided with female threading on an inner circumferential surface thereof. The male threading of the support column 16a engages with the female threading of the handle 16b. By turning the handle 16b, the support column 16a is displaced in an up/down direction along the length direction of the support column 16a, and the sample stage 15, which is mounted at the top end of the support column 16a, is displaced up and down, enabling a height position of the sample stage 15 to be adjusted.

The console 17 includes a display portion 17a and an input portion 17b. The display portion 17a is configured by, for example, an LCD (Liquid Crystal Display) and displays various screens in accordance with a display signal instruction input by the controller 19. The input portion 17b includes, for example, a touch screen panel that is formed so as to lie over a display screen of the display portion 17a, and includes various operation buttons such as number buttons and a start button. An operation signal based on an operation by a user is output to the controller 19.

The memory 18 is configured by a memory device such as a non-volatile semiconductor memory or a hard disk, and stores data or the like related to various processes.

The controller 19 is configured to include a CPU 19*a*, a RAM 19*b*, and a ROM 19*c*, and integrally controls various portions of the hardness tester 100.

The CPU 19*a* retrieves a processing program stored in the ROM 19*c*, then opens and executes the processing program in the RAM 19*b*, thereby performing overall control of the hardness tester 100.

The RAM 19*b* opens the processing program executed by the CPU 19*a* in a program storage region within the RAM 19*b* and stores in a data storage region input data, processing results generated during execution of the processing program, and the like.

The ROM 19*c* stores various kinds of data, various kinds of processing programs, and the like that allow the CPU 19*a* to execute overall control of the hardness tester 100. Specifically, the ROM 19*c* stores, for example, a hardness test run program 191, an environmental temperature response program 192, and the like.

Next, a process in which the controller 19 of the hardness tester 100 performs is described.

The controller 19 of the hardness tester 100 according to the present embodiment performs a predetermined process in response to the displacement amount of the plate spring 11*a* detected by the spring displacement detector 13 and the displacement amount of the loading arm 11 detected by the arm displacement detector 14. Specifically, in a condition where the driver 12 is in operation so as to press the indenter 1 against the sample S, the controller 19 performs a process to calculate the hardness of the sample S based on the displacement amount of the plate spring 11*a* and the displacement amount of the loading arm 11 that are detected by the spring displacement detector 13 and the arm displacement detector 14 respectively. In addition, in a condition where the driver 12 is not in operation, the controller 19 performs a process to determine that the loading arm 11 and the plate spring 11*a* are deformed due to changes in environmental temperature, when the spring displacement detector 13 and the arm displacement detector 14 detect the displacement amount of respective objects (plate spring 11*a* and the loading arm 11).

For example, when an execution instruction of the hardness test is input by the user via the console 17 which is regarded as a trigger, the CPU 19*a* of the controller 19 opens and executes a hardness test execution program 191 in the RAM 19*b*, and thereby the driver 12 is operated so as to rotate the loading arm 11 in a direction where the indenter 1 is pressed against the sample S. Then, the spring displacement detector 13 detects the displacement amount of the plate spring 11*a* when the indenter 1 is pressed against the sample S, and also the arm displacement detector 14 detects the displacement amount of the loading arm 11 when the indenter 1 is pressed against the sample S. Based on the detected displacement amount, a Rockwell hardness test is performed to calculate the hardness of the sample S. The calculated value of the hardness of the sample S is displayed on the display portion 17*a*.

In addition, in a condition where the execution instruction of the hardness test is not input by the user and the driver 12 is not in operation, the fact that the displacement amount of respective object has been detected by the spring displacement detector 13 and arm displacement detector 14 is regarded as a trigger. The CPU 19*a* of the controller 19 then opens and executes the environmental temperature response program 192 in the RAM 19*b*, and thereby performs a process to determine that the loading arm 11 and the plate spring 11*a* are deformed due to the changes in environmental temperature. In other words, in the hardness tester 100 where a hardness test is not performed, when the spring displacement detector 13 detects the displacement amount of the plate spring 11*a* and the arm displacement detector 14 detects the displacement amount of the loading arm 11, the determination is made that the loading arm 11 and plate spring 11*a* are deformed due to the changes in environmental temperature.

Here, the deformation of the loading arm 11 and the plate spring 11*a* accompanied by the changes in environmental temperature, which is a concern for the inventors of the present invention, is described with comparison to the displacement of the loading arm 11 and the plate spring 11*a* during the hardness test operation.

Figure 3A:
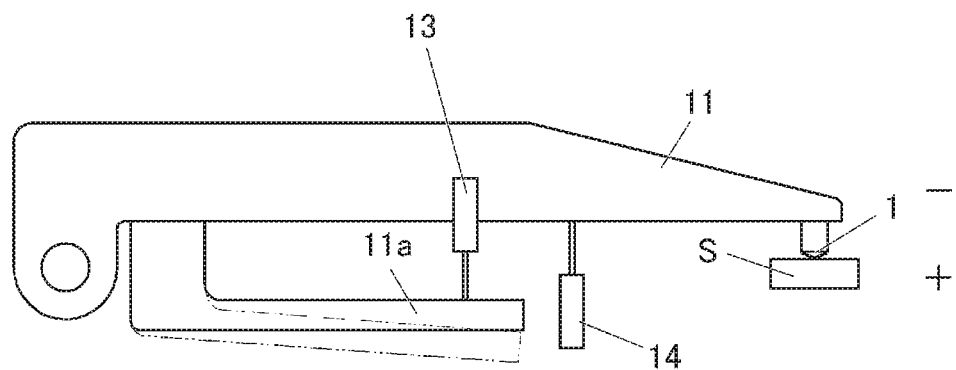
FIGS. 3A and 3B schematically show a state where a loading arm and a plate spring of the hardness tester are activated with a hardness test.
Figure 3B:
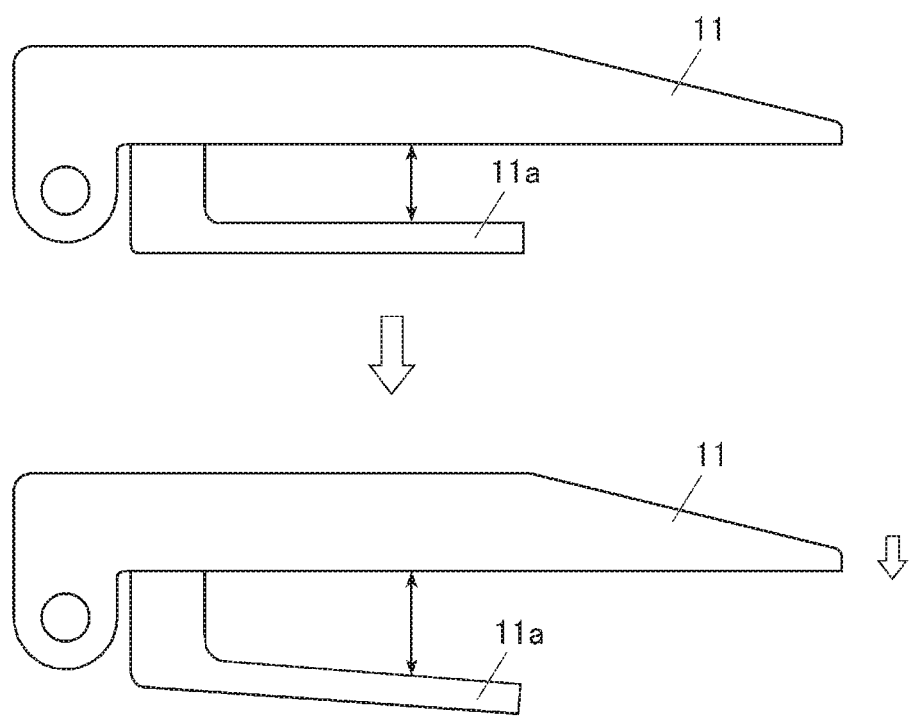

First, a description of the displacement of the loading arm 11 and the plate spring 11*a* during the hardness test operation is given. When the hardness test is performed by the hardness tester 100, as shown in FIGS. 3A and 3B for example, from a state where the indenter 1 is in contact with the front surface of the sample S, the driver pulls the plate spring 11*a* downward so as to rotate the loading arm 11 in the direction which the indenter 1 is pressed against the sample S. At this time, the spring displacement detector 13 detects displacement in a direction which the plate spring 11*a* expands (positive direction) and the arm displacement detector 14 detects displacement displacing the forefront end of the loading arm 11 downward (positive direction).

Figure 4A:
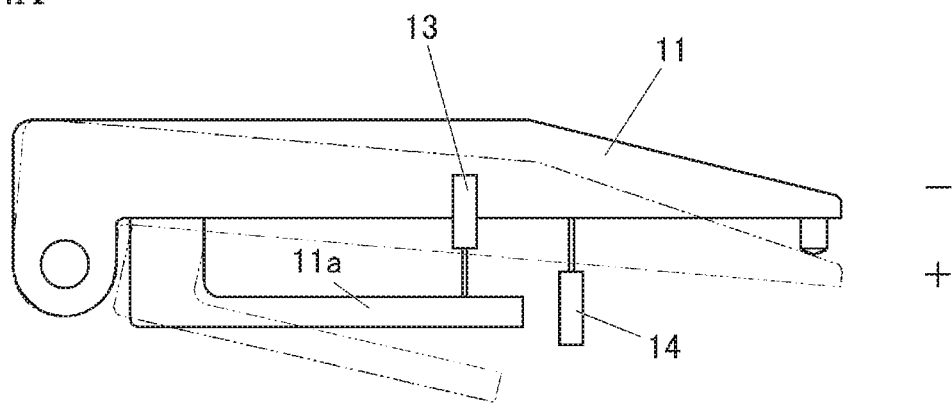
FIGS. 4A and 4B schematically show a state where the loading arm and the plate spring of the hardness tester are expanded with heat.
Figure 4B:
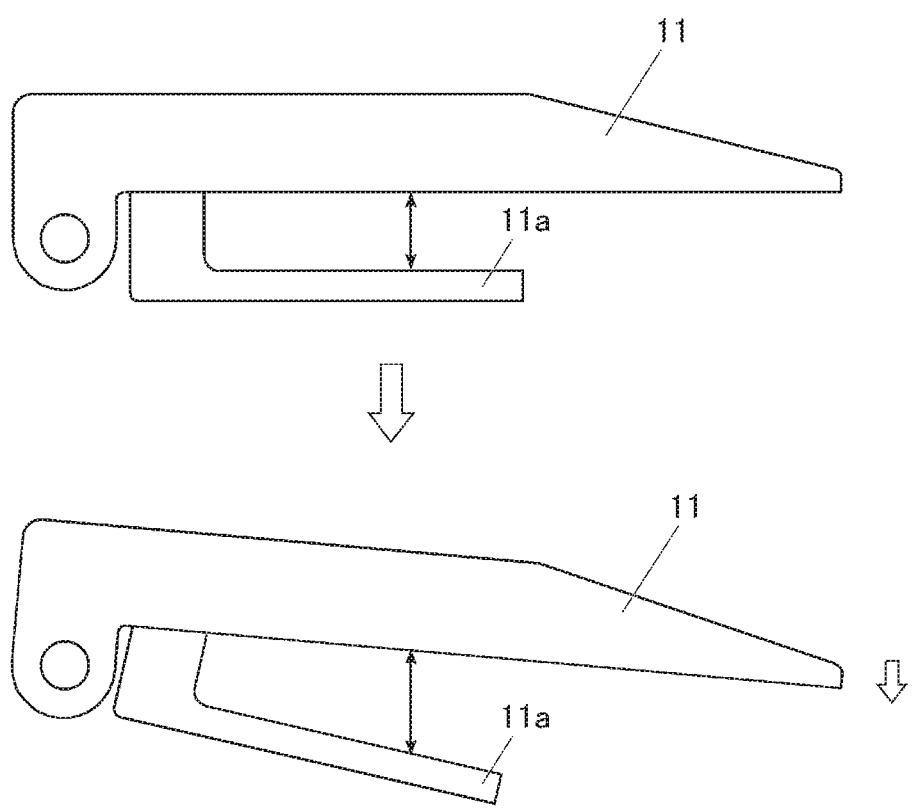

In contrast, when the environmental temperature such as a test room where the hardness tester 100 is installed increases (for example, increase of 10 to 20° C.), the loading arm 11 and the plate spring 11*a* made of metal expand with heat. At this time, different from the time when the hardness test is performed, the indenter 1 is not in contact with the sample S and the loading arm 11 can rotate freely. Therefore, the loading arm 11 and the plate spring 11*a* expanded with heat deform without receiving surrounding regulation. As shown in FIGS. 4A and 4B, when the loading arm 11 and the spring plate 11*a* are expanded with heat, the inventors of the present invention confirmed a thermal expansion being captured such that the spring displacement detector 13 detects deformation in the direction which the plate spring 11*a* expands (positive direction) and the arm displacement detector 14 detects deformation displacing the forefront end of the loading arm 11 downward (positive direction). When the loading arm 11 and the plate spring 11*a* are expanded with heat, directions of deformation detected by the respective spring displacement detector 13 and the arm displacement detector 14 are the same positive directions as the directions of deformation of the plate spring 11*a* and the loading arm 11 detected by spring displacement detector 13 and the arm displacement detector 14 during the hardness test operation. Therefore, when the hardness tester of the prior art was expanded with heat, an assumption can be made that the deformation of the loading arm and the plate spring detected by an arm position sensor (arm displacement detector 14) and a spring displacement amount sensor (spring displacement detector 13) were mistaken as a trigger for starting the hardness test.

In addition, when the environmental temperature such as the test room where the hardness tester 100 is installed decreases (for example, decreases of 10 to 20° C.), the loading arm 11 and the plate spring 11*a* made of metal are contracted with heat. At this time, different from the hardness test operation, the indenter 1 is not in contact with the sample S and the loading arm 11 is in a freely rotatable state.

Figure 5A:
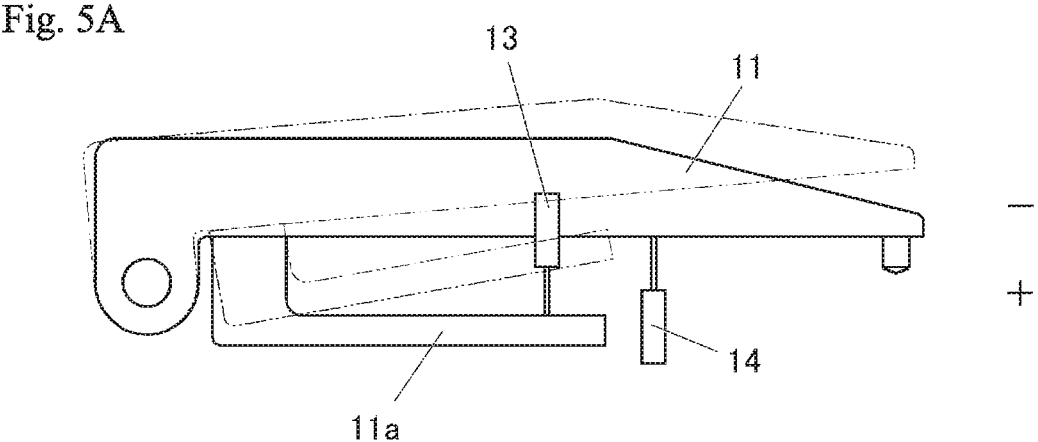
FIGS. 5A and 5B schematically show a state where the loading arm and the plate spring of the hardness tester are contracted with heat.
Figure 5B:
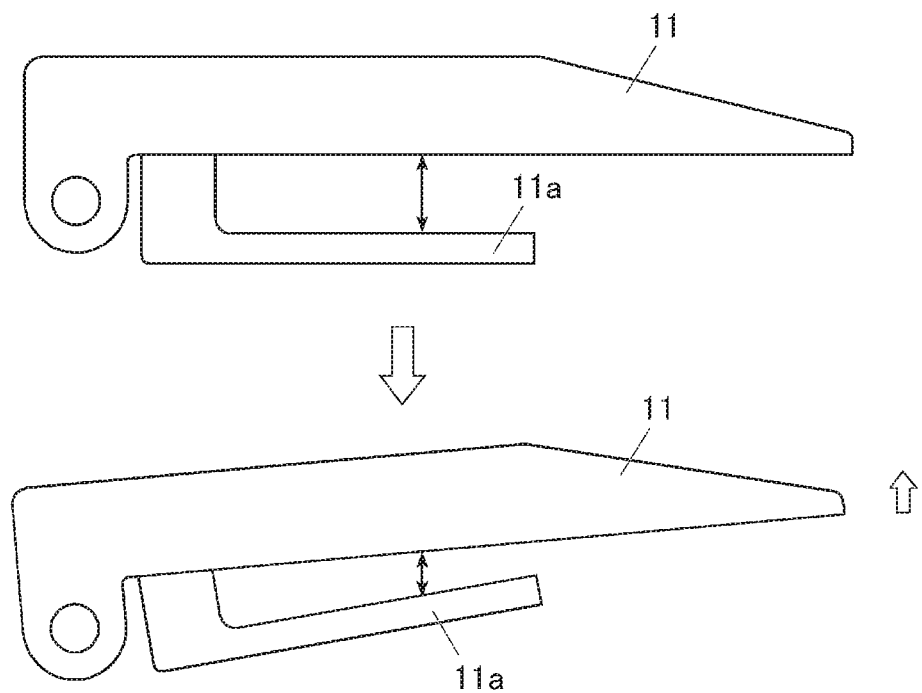

Therefore, the loading arm 11 and the plate spring 11a that are contracted with heat deform without receiving surrounding regulation. As shown in FIGS. 5A and 5B, when the loading arm 11 and the spring plate 11a are contracted with heat, the inventors of the present invention confirmed a thermal contraction being captured such that the spring displacement detector 13 detects deformation in a direction which the plate spring 11a narrows (negative direction) and the arm displacement detector 14 detects deformation displacing the forefront end of the loading arm 11 upward (negative direction).

In this way, at the time when the hardness tester 100 is not performing the hardness test, when the spring displacement detector 13 and the arm displacement detector 14 detect displacement of the plate spring 11a and the loading arm 11, the inventors were able to confirm that this is because the loading arm 11 and the plate spring 11a were expanded with heat, contracted with heat, or deformed. In addition, when the hardness tester 100 is not performing the hardness test, and in a condition where the driver 12 is not in operation, the inventors of the present invention caused the controller 19 of the hardness tester 100 to perform the process to determine that the loading arm 11 and plate spring 11a are deformed in response to the changes in environmental temperature when the spring displacement detector 13 and the arm displacement detector 14 detect the displacement amount of respective objects (plate spring 11a and loading arm 11).

Then, after performing the process to determine that the loading arm 11 and plate spring 11a are deformed in response to the changes in environmental temperature, the controller 19 of the hardness tester 100 of the present embodiment performs a process to inform the user to carry out an initialization resetting the displacement amount of respective object to zero, the displacement amount detected by the spring displacement detector 13 and the arm displacement detector 14 respectively. For example, a message such as "please initialize the hardness tester in order to reset a sensor" is displayed on the display portion 17a to inform the user to initialize the hardness tester 100 and encourage the user to carry out an initialization of the hardness tester 100. The user who sees the message may initialize the spring displacement detector 13 and the arm displacement detector 14 by operating the input portion 17b, such as pressing the reset button. In this way, when the spring displacement detector 13 and the arm displacement detector 14 are initialized, a hardness test can be performed by the hardness tester 100 corresponding to the environmental temperature thereof.

Also, after performing the process to determine that the loading arm 11 and plate spring 11a are deformed in response to the changes in environmental temperature, the controller 19 of the hardness tester 100 of the present embodiment carries out an initialization process to reset the displacement amount of each object to zero, the displacement amount detected by the spring displacement detector 13 and the arm displacement detector 14 respectively. For example, the controller 19 determines that the loading arm 11 and the plate spring 11a are deformed in response to the changes in environmental temperature, and then performs an internal process automatically to initialize the spring displacement detector 13 and the arm displacement detector 14. When the controller 19 carries out the initialization process automatically, data such as the date and time when the initialization process was performed is stored in the memory 18 such that the user can confirm the initialization history later on the display portion 17a, for example. When the spring displacement detector 13 and the arm displacement detector 14 are initialized, a hardness test can be performed by the hardness tester 100 corresponding to the environmental temperature.

As noted above, with the hardness tester 100 of the present embodiment, even though the loading arm 11 and the plate spring 11a are deformed in response to the changes in environmental temperature, the spring displacement detector 13 and the arm displacement detector 14 can be initialized so as to adapt to the environment such as the test room where the hardness tester 100 is installed. Therefore, a favorable hardness test can be performed by the hardness tester 100 corresponding to the environmental temperature.

In the present embodiment noted above, when the loading arm 11 and the plate spring 11a are expanded with heat, the spring displacement detector 13 detects deformation in the direction which the plate spring 11a expands (positive direction) and the arm displacement detector 14 detects deformation displacing the forefront end of the loading arm 11 downward (positive direction). Also, when the loading arm 11 and the plate spring 11a are contracted with heat, the spring displacement detector 13 detects deformation in a direction which the plate spring 11a narrows (negative direction) and the arm displacement detector 14 detects deformation displacing the forefront end of the loading arm 11 upward (negative direction). However, the present invention is not limited to this because the deformation of the loading arm 11 and the plate spring 11a differs based on a shape and a type of the metal material configuring the loading arm 11 and the plate spring 11a.

Moreover, appropriate modifications to other specific fine points of the structure are, of course, also possible.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester for measuring hardness of a sample, the hardness tester comprising:
   a loading arm provided with an indenter;
   a plate spring, a first end of which is fixed to the loading arm;
   a press that displaces the loading arm by bending the plate spring, and that presses the indenter against the sample;
   a spring displacement detector that detects a displacement amount of the plate spring;
   an arm displacement detector that detects a displacement amount of the loading arm; and
   a controller that carries out a predetermined process in response to detection by the spring displacement detector of the displacement amount of the plate spring, and in response to detection by the arm displacement detector of the displacement amount of the loading arm, wherein:

in a condition where the press is in operation so as to press the indenter against the sample, the controller calculates hardness of the sample based on the detected displacement amount of the plate spring, and the detected displacement amount of the loading arm, and in a condition where the press is not in operation, and when the spring displacement detector detects the displacement amount of the plate spring and the arm displacement detector detects the displacement amount of the loading arm, the controller informs a user to carry out an initialization that resets the respective detected displacement amounts of the plate spring and loading arm to zero.

2. A hardness tester measuring hardness of a sample, the hardness tester comprising:

a loading arm provided with an indenter;

a plate spring, a first end of which is fixed to the loading arm;

a press that displaces the loading arm by bending the plate spring, and that presses the indenter against the sample;

a spring displacement detector that detects a displacement amount of the plate spring;

an arm displacement detector that detects a displacement amount of the loading arm; and a controller that carries out a predetermined process in response to detection by the spring displacement detector of the displacement amount of the plate spring, and in response to detection by the arm displacement detector of the displacement amount of the loading arm, wherein:

in a condition where the press is in operation so as to press the indenter against the sample, the controller calculates hardness of the sample based on the detected displacement amount of the plate spring and the detected displacement amount of the loading arm, and in a condition where the press is not in operation, and when the spring displacement detector detects the displacement amount of the plate spring and the arm displacement detector detect the displacement amount of the loading arm, the controller resets the respective detected displacement amounts of the plate spring and loading arm to zero.

* * * * *